(12) United States Patent
Jiang et al.

(10) Patent No.: US 7,169,284 B1
(45) Date of Patent: Jan. 30, 2007

(54) HIGH SURFACE AREA CATHODE FOR ELECTROLYTIC CAPACITORS USING CONDUCTIVE POLYMER

(75) Inventors: Naixiong Jiang, Palo Alto, CA (US); Timothy Marshall, Pickens, SC (US); Melissa Moore, Greenville, SC (US); Christopher R. Feger, Easley, SC (US); Thomas F. Strange, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 435 days.

(21) Appl. No.: 10/668,899

(22) Filed: Sep. 22, 2003

(51) Int. Cl.
*C25D 9/02* (2006.01)
*C25D 5/44* (2006.01)

(52) U.S. Cl. .................. 205/317; 205/212; 205/213; 205/214

(58) Field of Classification Search ................ None
See application file for complete search history.

(56) References Cited

U.S. PATENT DOCUMENTS

| | | | |
|---|---|---|---|
| 4,518,471 A | 5/1985 | Arora | 204/129.1 |
| 4,525,249 A | 6/1985 | Arora | 204/129.75 |
| 4,724,053 A * | 2/1988 | Jasne | 106/236 |
| 4,805,074 A * | 2/1989 | Harakawa et al. | 361/525 |
| 4,839,322 A * | 6/1989 | Yodice | 502/159 |
| 4,910,645 A | 3/1990 | Jonas et al. | 361/525 |
| 5,131,388 A | 7/1992 | Pless et al. | 128/419 D |
| 5,522,851 A | 6/1996 | Fayram | 607/5 |
| 5,715,133 A | 2/1998 | Harrington et al. | 361/500 |
| 5,914,852 A * | 6/1999 | Hatanaka et al. | 361/523 |
| 6,083,635 A | 7/2000 | Jonas et al. | 428/690 |
| 6,136,176 A * | 10/2000 | Wheeler et al. | 205/328 |
| 6,157,479 A | 12/2000 | Heuer et al. | 359/265 |
| 6,201,051 B1 | 3/2001 | Mager et al. | 524/261 |
| 6,852,830 B2 * | 2/2005 | Groenendaal et al. | 528/373 |
| 6,882,522 B2 * | 4/2005 | Naito et al. | 361/523 |
| 2003/0176628 A1 * | 9/2003 | Groenendaal et al. | 528/373 |
| 2004/0233614 A1 * | 11/2004 | Naito et al. | 361/516 |

FOREIGN PATENT DOCUMENTS

JP 02-218716 * 8/1990

OTHER PUBLICATIONS

Hong, et al.; "Conducting Polymer with Medal Oxide for Electrochemical Capacitor"; Journal of Electrochemical Society; 148 (2) A156-A163 (2001).
Carlberg, et al.; "Poly(3,4-ethylenedioxythiophene) as Electrode Material in Electrochemical Capacitors"; J. Electrochem. Soc.; vol. 144; No. 4; L61-L64; Apr. 1997.

* cited by examiner

*Primary Examiner*—Harry D Wilkins, III
(74) *Attorney, Agent, or Firm*—Steven M. Mitchell

(57) ABSTRACT

The present invention is directed to a conductive polyethylenedioxythiophene (PEDOT) polymer coated electrode adapted for use as a cathode electrode of an electrolytic capacitor and a method of manufacturing the same. According to the present invention, a metal foil substrate is placed in an aqueous solution of a doped 3,4-ethylenedioxythiophene (EDOT) monomer and a co-solvent, to dissolve the EDOT monomer, and a current is applied until the desired thickness of the polymer coating is electrochemically deposited. Additionally, an organic acid is added to the aqueous solution to act as an oxidizer. In order to improve the uniformity and adherence of the coating a surfactant may also be added. In a preferred embodiment, the EDOT monomer and cosolvent are first mixed, and then added to a water solution of oxidizer and dopant. The polymer film is deposited electrochemically onto the substrate by applying a DC current between 0.05 mA/cm$^2$ and 5.0 mA/cm$^2$ for 1 to 60 minutes, more preferably between about 0.13 mA/cm$^2$ to about 0.26 mA/cm$^2$ for between 9 and 18 minutes, such that a conductive polyethylenedioxythiophene (PEDOT) coating is formed on the electrode surface. According to the present invention, the increased surface area of the coated cathode results in lower gas generation and, therefore, reduced capacitor swelling, reduced oxide buildup on the cathode and prevention of electrolysis. The present invention results in electrodes with a minimum capacitance of 1 mF/cm$^2$. The present invention also makes it possible to use thinner electrodes than conventional aluminum electrodes, thereby reducing the physical dimensions of the capacitor.

30 Claims, 1 Drawing Sheet

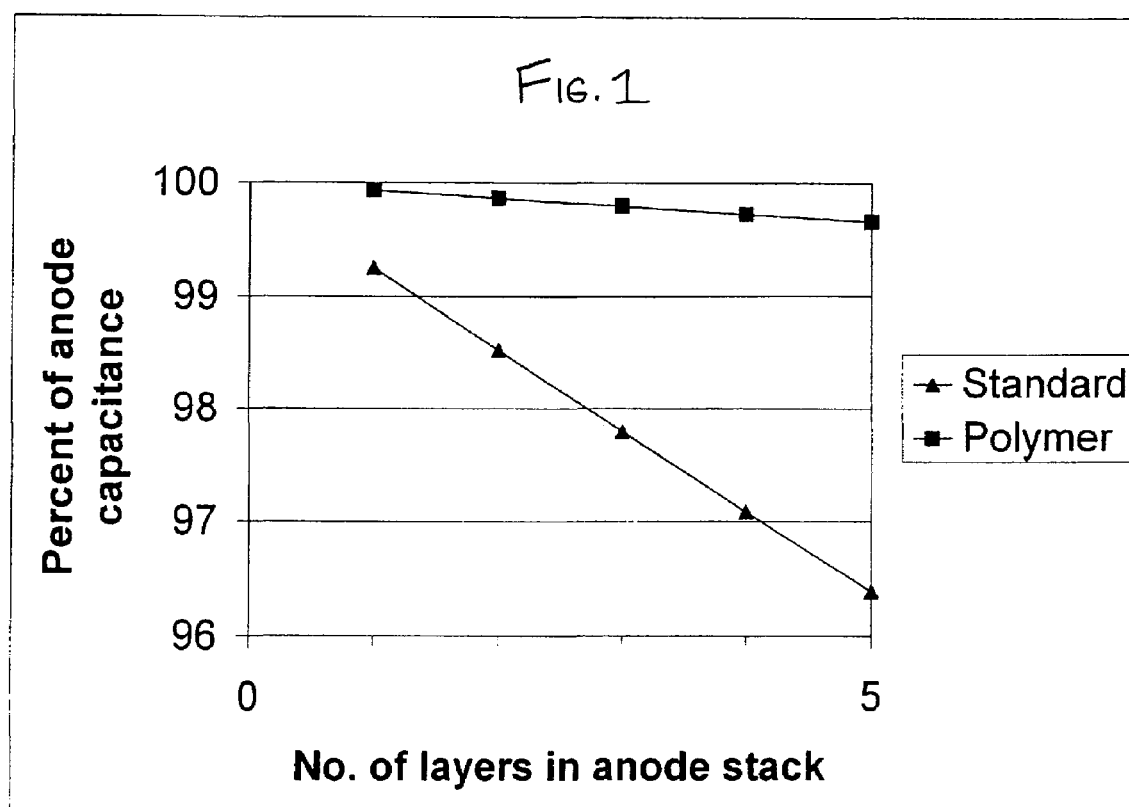

HIGH SURFACE AREA CATHODE FOR ELECTROLYTIC CAPACITORS USING CONDUCTIVE POLYMER

BACKGROUND OF THE INVENTION

1. Field of the Invention

The present invention relates to the use of a conductive polymer coated electrode within an electrolytic capacitor and more particularly, to a conductive polyethylenedioxythiophene (PEDOT) polymer coated electrode adapted for use as a cathode electrode of an electrolytic capacitor and a method of manufacturing the same.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors typically consist of a cathode electrode, an electrically conductive electrolyte and a porous anode with a dielectric oxide film formed thereon. While aluminum is the preferred metal for the anode plates, other metals such as tantalum, magnesium, titanium, niobium, zirconium and zinc may be used. A typical electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

The need for high voltage, high energy density capacitors is most pronounced when employed in implantable cardiac defibrillators (ICDs). In ICDs, as in other applications where space is a critical design element, it is desirable to use capacitors with the greatest possible capacitance per unit volume. Since the capacitance of an electrolytic capacitor is provided by the anodes, a clear strategy for increasing the energy density in the capacitor is to minimize the volume taken up by paper and cathode and maximize the number of anodes. A multiple anode flat, stacked capacitor configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. In order to achieve higher energy densities, it has been necessary to stack three, four and five anodes per layer. However, due to the higher capacitance values achieved with multiple anodes, traditional chemically etched aluminum cathodes provide insufficient capacitance coverage at the desired thickness (30 microns or less).

In an electrolytic capacitor, the anode exhibits a dielectric capacitance capable of holding several hundred volts. The cathode exhibits a double layer capacitance capable of holding a maximum of approximately 3 volts. The anode capacitance and the cathode capacitance are in series. When a charged electrolytic capacitor pumps current through a resistive load, the anode dielectric capacitance can be visualized as discharging towards a ground potential from a less positive potential; and the cathode double layer capacitance can be visualized as charging from a negative potential to a more positive potential. The double layer capacitance is directly proportional to the effective surface area of the cathode. For traditional 20–30 micron thick aluminum foil cathodes, the double layer capacitance is typically in the range of 100–250 $\mu F/cm^2$.

The cathode capacitance must be many times higher than the anode capacitance if most of the anode gain is to be realized. When the cathode double layer capacitance is much larger than the anode dielectric capacitance, the cathode electrode maintains a negative potential. However, if the cathode capacitance is not much larger than the anode capacitance, the cathode electrode can develop a positive potential. If the cathode develops a positive potential, several undesirable effects can occur: (1) during a pulse discharge operation, a significant overvoltage can be fed back to the cathode, resulting in oxide buildup on the cathode which reduces the capacitor performance, (2) electrolysis can occur that consumes electrolyte and deteriorates the performance of the capacitor with usage, and (3) gaseous electrolysis byproducts can cause swelling of the capacitor. Since a reverse voltage drop at the cathode in excess of about one volt results in cathode formation and hydrogen gas production, this undesirable condition determines the condition for the minimum acceptable ratio of cathode to anode capacitance.

Thus, especially in high energy density capacitors, there is a need for the development of cathodes that have high double layer capacitance while maintaining the thinnest profile possible.

SUMMARY OF THE INVENTION

The present invention is directed to the use of a conductive polymer coated electrode within an electrolytic capacitor and more particularly, to a conductive polyethylenedioxythiophene (PEDOT) polymer coated electrode adapted for use as a cathode electrode of an electrolytic capacitor and a method of manufacturing the same.

According to the present invention, a conductive polymer coating is deposited electrochemically on a metal foil substrate. The metal foil substrate is placed in an aqueous solution of 3,4-ethylenedioxythiophene (EDOT) monomer and a current is applied until the desired thickness of the polymer coating is deposited. Preferably, the aqueous solution consists of a doped EDOT monomer, a dopant that is incorporated during deposition, and a co-solvent, to dissolve the EDOT monomer. EDOT concentrations are preferably between about 0.25% by weight and about 5.0% by weight, more preferably between about 0.5% by weight and about 1.0% by weight. The dopant is preferably a sulfate-containing compound, such as ammonium persulfate, ammonium sulfate, naphthalene sulfate or lithium sulfate; any of several tetrafluoroborate salts; p-toluenesulfonic acid and its salts; or one of many electrolyte salts, such as lithium perchlorate, lithium trifluoromethanesulfonate, lithium hexafluoroarsenate, lithium hexafluorophosphate, phosphoric acid and its salts, phosphorous acid and its salts, and hypophosphorous acid and its salts; as would be apparent to one of ordinary skill in the art. The concentration of dopant is preferably between about 0.25% by weight to about 5.0% by weight, more preferably between about 0.5% by weight to about 1.0% by weight. The co-solvent must be miscible in water and is preferably acetonitrile; an alkyl alcohol such as methanol, ethanol, 1-propanol, 2-propanol and the like; or a glycol such as ethylene glycol, 1,2-propanediol, 1,3-propanediol, 2-methyl-1,3-propanediol and the like. The concentration of co-solvent is preferably between about 1% by weight to about 40% by weight, more preferably between about 15% by weight to 20% by weight. Additionally, an organic acid can be added to the solution to act as an oxidizer. The organic acid is preferably a hydroxy acid, such as malic acid or citric acid, or a dicarboxylic acid, such as oxalic acid, maleic acid, suberic acid, azelaic acid or sebacic acid. The concentration of oxidizer is preferably between about 1.0% by weight to about 5.0% by weight, more preferably between about 1.0% to about 3.0% by weight. In order to improve the uniformity and adherence of the coating a surfactant may also be added. The preferred surfactant is dioctyl sulfosuccinate, but other surfactant compounds may be used, as would be apparent to one of ordinary skill in the art. The surfactant is provided preferably in a concentration of about 0.01% by weight to about 0.5% by weight, more preferably about 0.1% by weight to about 0.25% by weight.

In a preferred embodiment, the EDOT monomer and cosolvent are first mixed, and then added to a water solution of oxidizer and dopant. The polymer film is deposited electrochemically onto the substrate by applying a DC current between 0.05 mA/cm$^2$ and 5.0 mA/cm$^2$ for 1 to 60 minutes, more preferably between about 0.13 mA/cm$^2$ to about 0.26 mA/cm$^2$ for between 9 and 18 minutes, such that a conductive polyethylenedioxythiophene (PEDOT) coating is formed on the electrode surface. Alternatively, a square wave current profile can be applied, for example in which the current profile is a 2 minute, 0.25 mA/cm$^2$ treatment followed by a 7 minute, 0.5 mA/cm$^2$ treatment and a 1 minute 0.25 mA/cm$^2$ treatment.

According to the present invention, the increased surface area of the coated cathode results in lower gas generation and, therefore, reduced capacitor swelling, reduced oxide buildup on the cathode and prevention of electrolysis. The present invention results in electrodes with a minimum capacitance of 1 mF/cm$^2$. The present invention also makes it possible to use thinner electrodes than conventional aluminum cathodes, thereby reducing the physical dimensions of the capacitor.

BRIEF DESCRIPTION OF THE DRAWINGS/FIGURES

FIG. 1 shows the anode capacitance realization as a function of cathode capacitance for both a conventional cathode as well as the polymer coated cathode of the present invention.

DETAILED DESCRIPTION OF THE INVENTION

The present invention relates to a conductive polymer coated electrode adapted for use as a cathode electrode of an electrolytic capacitor and more particularly, to a conductive polyethylenedioxythiophene (PEDOT) polymer coating formed on a metal substrate. The increased double layer capacitance of the coated cathode prevents the growth of oxide on the electrode and limits electrolysis and hydrogen gas generation, thereby increasing performance of the capacitor. Additionally, the present invention makes it possible to use thinner electrode foils, thereby reducing the physical dimension of the implantable lead or electrolytic capacitor.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

According to the present invention, a conductive polymer coating is deposited electrochemically on a metal foil substrate. The process according to the present invention begins by cleaning a metal foil substrate, preferably a valve metal foil substrate, such as aluminum, titanium, niobium, tantalum, magnesium, nickel, zirconium or zinc, or a noble metal foil substrate, such as platinum, silver or gold, to remove any oils or residue, provide a higher surface area substrate and improve adhesion of the coating. The coating process of the present invention can proceed without first cleaning the foil, but a cleaning step is preferred. The cleaning process can be performed either as a chemical etch process, for example, in a 5% oxalic acid solution, or as an electrochemical etch, for example, in a mixture of hydrofluoric and sulfuric acids or in an ethanolic solution of elemental bromine, as would be apparent to one of ordinary skill in the relevant art. Other etching solutions may also be used, as would be apparent to one of ordinary skill in the relevant art. In one embodiment, a titanium substrate is treated with 5% oxalic acid solution at 90° C. for about 1–30 minutes, preferably about 4 minutes, to etch the foil surface. Alternatively, in a preferred embodiment, the coating process of the present invention can proceed without first etching the foil. Other cleaning methods may also be used, as would be apparent to one of ordinary skill in the relevant art. In alternative embodiments, the cleaning step may include soaking the metal foil substrate in acetone, sodium hydroxide, nitric acid or sulfuric acid; wiping the foil with an acetone solution; washing the foil with acetone; and/or washing the foil in SIMPLE GREEN industrial cleaner, available from Sunshine Makers, Inc., Huntington Harbour, Calif. The cleaned substrate may then be rinsed in distilled water.

The metal foil substrate is placed in an aqueous solution of the monomer EDOT (3,4-ethylenedioxythiophene) and a current is applied until the desired thickness of the polymer coating is deposited. Preferably, the aqueous solution consists of a doped EDOT monomer and a co-solvent, to dissolve the EDOT monomer. EDOT concentrations are preferably between about 0.25% by weight and 5.0% by weight, more preferably between about 0.5% by weight and about 1.0% by weight.

The dopant is preferably a sulfate-containing compound, such as ammonium persulfate, ammonium sulfate, naphthalene sulfate or lithium sulfate. The dopant may also be any of several tetrafluoroborate salts, such as tetraethylammonium tetrafluoroborate, tetramethyl tetrafluoroborate, tetraethyl tetrafluoroborate, tetrapropyl tetrafluoroborate, or tetrabutyl tetrafluoroborate. Additionally, the dopant may be p-toluenesulfonic acid and its salts; one of many electrolyte salts, such as lithium perchlorate, lithium trifluoromethanesulfonate, lithium hexafluoroarsenate, lithium hexafluorophosphate, phosphoric acid and its salts, phosphorous acid and its salts, and hypophosphorous acid and its salts; as would be apparent to one of ordinary skill in the art. The concentration of dopant is preferably between about 0.25% by weight to about 5.0% by weight, more preferably between about 0.5% by weight to about 1.0% by weight.

The co-solvent must be miscible in water and is preferably acetonitrile; an alkyl alcohol such as methanol, ethanol, 1-propanol, 2-propanol and the like; or a glycol such as ethylene glycol, 1,2-propanediol, 1,3-propanediol, 2-methyl-1,3-propanediol and the like. The concentration of co-solvent is preferably between about 1% by weight to about 40% by weight, more preferably between about 15% by weight to 20% by weight.

Additionally, an organic acid is added to the solution to act as an oxidizer. The organic acid is preferably a hydroxy acid, such as malic acid or citric acid, or a dicarboxylic acid, such as oxalic acid, maleic acid, suberic acid, azelaic acid or sebacic acid. The concentration of oxidizer is preferably between about 1.0% by weight to about 5.0% by weight, more preferably between about 1.0% to about 3.0% by weight.

In order to improve the uniformity and adherence of the coating a surfactant is added. The preferred surfactant is dioctyl sulfosuccinate, but other surfactant compounds may be used, as would be apparent to one of ordinary skill in the art. The surfactant is provided preferably in a concentration of about 0.01% by weight to about 0.5% by weight, more preferably about 0.1% by weight to about 0.25% by weight.

In a preferred embodiment, the EDOT monomer and cosolvent are first mixed, and then added to a water solution of oxidizer and dopant. Alternatively, however, the EDOT monomer, cosolvent, oxidizer and dopant can be mixed simultaneously. Other processes can also be used as would be apparent to one of ordinary skill in the art. The metal foil substrate is then placed in the aqueous solution.

The polymer film is deposited electrochemically onto the substrate by applying a DC current between 0.05 mA/cm$^2$ and 5.0 mA/cm$^2$ for 1 to 60 minutes, more preferably between about 0.13 mA/cm$^2$ to about 0.26 mA/cm$^2$ for between 9 and 18 minutes, such that a conductive polyethylenedioxythiophene (PEDOT) coating is formed on the electrode surface. Alternatively, a square wave current profile can be applied, for example in which the current profile is a 2 minute, 0.25 mA/cm$^2$ treatment followed by a 7 minute, 0.5 mA/cm$^2$ treatment and a 1 minute 0.25 mA/cm$^2$ treatment. Nitrogen or another inert gas may be bubbled through the aqueous EDOT monomer solution during the coating process to remove dissolved oxygen.

The sample may then be rinsed in acetone, methanol and/or a weak basic solution, as would be apparent to one of ordinary skill in the art, followed by a water rinse, and allowed to air dry. The substrate may be placed back into the aqueous solution and a current reapplied additional times, in order to further enhance the surface area of the electrode.

The method according to the present invention results in cathode foil with a minimum capacitance of 1 mF/cm$^2$. The increased surface area according to the present invention results in lower hydrogen gas generation and therefore reduced capacitor swelling, reduced oxide buildup on the cathode and prevention of electrolysis, which leads to deteriorated capacitor performance. The present invention also makes it possible to use thinner electrodes, thereby reducing the physical dimensions of the capacitor.

During the discharge transient, voltage is divided between the anode and cathode according to the ratio of the anode and cathode oxide resistance and specific capacitance. Since a reverse voltage drop at the cathode in excess of about one volt results in cathode formation and hydrogen gas production, this undesirable condition defines the minimum acceptable ratio of cathode to anode capacitance. This ratio is somewhat sensitive to design parameters and the pulse application. A value of 100/1 is preferred for the multiple anode flat, stacked capacitor configuration of the present invention. Existing cathodes, such as the Kappa 510 cathode available from Becromal of America Inc. of Clinton, Tenn., provide acceptable capacitance values, but thickness remains a concern. FIG. 1 shows the anode capacitance realization as a function of cathode capacitance for both the Kappa 510 cathode as well as the polymer coated cathode of the present invention (with a value of 2 mF/cm$^2$).

Additional advantages of the present invention include: being halide free; a mostly aqueous solution; and the ability to deposit over a large range of conditions.

An electrolytic capacitor according to the present invention is constructed of anode and cathode layers, stacked with a paper insulator or spacer between each layer. The anode layer is composed of one or more anode foils stacked together without any paper spacer, to form a high energy density anode element. The anode and cathode layers are then grouped together in a parallel connection to produce sufficient capacitance for the intended function. This finished stack is inserted into a case with a geometry closely following the contour of the stack, and designed to minimize the space occupied inside the finished defibrillator. A wound roll configuration may also be used, as would be apparent to those skilled in the relevant art.

Aluminum foil is preferred for the anode layers, because of its ability to produce a sufficient quality oxide layer, its conductive properties, and its wide commercial availability. Other valve metal foils conventionally utilized in electrolytic capacitors could also be used, including titanium, tantalum, magnesium, niobium, zirconium and zinc. Preferably, a strip of unetched, high purity (99.99%) aluminum foil with high cubicity, wherein at least 85% of the crystalline aluminum structure is oriented in a normal position (i.e., a (1,0,0) orientation) relative to the surface of the foil, is used. Such foils are well-known in the art and are readily available from commercial sources known to those skilled in the art.

In a preferred embodiment of the present invention, the anode foil may be etched in an aqueous halide based etch solution, typically a hydrochloric acid or sodium chloride solution, according to a conventional etch process; for example, U.S. Pat. No. 5,715,133 to Harrington et al. describes a suitable method of etching foil and is incorporated herein by reference in its entirety. The etch solution preferably consists of about 1.3% by weight sodium chloride, about 3.5% by weight sodium perchlorate, about 0.35% sodium persulfate, and deionized water. The etch solution preferably is heated to a temperature in the range of about 60° C. to about 95° C. The foil is etched at a DC current density of about 0.01 A/cm$^2$ to about 0.30 A/cm$^2$. A charge of about 20 coulombs/cm$^2$ to 100 coulombs/Cm$^2$ is passed through the foil during the etching process, which requires an etch time in the range of about 2 minutes to about 12 minutes.

The foil is then removed from the etch solution and rinsed in deionized water. The tunnels formed during the initial etch are then widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. No. 4,518,471 and U.S. Pat. No. 4,525,249, both of which are incorporated herein by reference.

After the etch tunnels have been widened, the foil is again rinsed with deionized water and dried. Finally, a barrier oxide layer may be formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in the poor performance and reliability of an electrolytic capacitor. In particular, a high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100–1000 μS/cm, preferably 500 μS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt.

The etched and formed anode foils are cut and the capacitor is assembled. An electrolytic capacitor stack according to the present invention consists of a number of units of: cathode, a paper spacer, one or more anodes, a paper spacer and cathode; with neighboring units sharing the cathode between them.

The pre-assembled capacitor is then vacuum impregnated with an electrically conductive electrolyte, by placing the capacitor in contact with the electrolyte and reducing the pressure to less than 50 cm Hg. The capacitor is held at this low pressure for 5 to 45 minutes and then pressure is restored, using the pressure to force the electrolyte mixture into the capacitor stack. The capacitor is then removed and placed in an oven at a temperature of about 65° C. to about 90° C. and a maximum oxygen atmospheric concentration of 2% for a period of about 2 hours to about 24 hours. The capacitor is then aged in a normal manner by applying the working voltage to the capacitor, allowing the capacitor to reach this voltage, and then allowing the current to decrease.

Electrolytic capacitors according to the present invention can be incorporated into implantable medical devices, such as implantable cardioverter defibrillators (ICDs), as would be apparent to one skilled in the art, as described in U.S. Pat. No. 5,522,851.

Having now generally described the invention, the same will be more readily understood through reference to the following examples. The following examples are illustrative, but not limiting, of the method and compositions of the present invention. Other suitable modifications and adaptations of the variety of conditions and parameters normally encountered and obvious to those skilled in the art are within the spirit and scope of the invention.

EXAMPLES

Example 1

Titanium foil was cut into 4 $cm^2$ samples and cleaned in a 5% oxalic acid solution at 90° C. for two minutes. A 100 ml solution was prepared of 0.5 M 3,4 ethylenedioxythiophene (EDOT) and 0.1 M tetraethylammonium tetrafluoroborate in acetonitrile.

The titanium foils were exposed to the solution at room temperature at varying current densities and times, as shown in Table 1 below, and the capacitance and ESR were observed.

TABLE 1

| Current Density ($mA/cm^2$) | Exposure time (min) | Capacitance (mF) | ESR (Ω) |
|---|---|---|---|
| 0.80 | 5 | 8.43 | 3.8162 |
| 1.25 | 5 | 13.86 | 3.6188 |
| 1.60 | 5 | 18.1 | 3.9104 |
| 1.75 | 8 | 12.05 | 3.8088 |
| 1.60 | 8 | 11.95 | 3.8909 |

Example 2

A coating solution was prepared with 0.13 M 3,4 ethylenedioxythiophene, 0.026 M tetraethylammonium tetrafluoroborate and 0.08 M lithium perchlorate ($LiClO_4$) in 150 ml acetonitrile.

Titanium foil samples of 4 $cm^2$ size were exposed to the solution while nitrogen was bubbled. Two current densities were examined. In the first experiment, a galvanic square wave was applied with the following set points: 1 mA (0.25 $mA/cm^2$) for 120 sec, 2 mA (0.5 $mA/cm^2$) for 420 sec and 1 mA (0.25 $mA/cm^2$) for 60 sec. Three cycles were performed. In the second experiment, the foil was exposed to a 2 mA (0.5 $mA/cm^2$) current for 15 minutes. After both treatments were complete, capacitance and ESR were observed on the foils (a) initially, (b) after an acetone rinse followed by a methanol rinse and one hour oven dry, and (c) after a two day air dry, as shown in Table 2 below.

TABLE 2

| Treatment | Time Measured | Capacitance (mF) | ESR (Ω) |
|---|---|---|---|
| Galvanic Square Wave | Initial | 9.15 | 3.9475 |
| Galvanic Square Wave | After rinse and 60 min. oven dry | 6.37 | 3.9065 |
| Galvanic Square Wave | After 2 day air dry | 3.330 | 5.5875 |
| 0.5 $mA/cm^2$ for 15 min | Initial | 16.74 | 3.9293 |
| 0.5 $mA/cm^2$ for 15 min | After rinse and 60 min. oven dry | 11.76 | 3.7547 |
| 0.5 $mA/cm^2$ for 15 min | After 2 day air dry | 6.23 | 6.1833 |

The coating on the sample treated with a galvanic square wave current applied was very uneven on one side but black and uniform on the other. The coating for the sample of the second experiment was slightly uneven on one side but very uniform and black on the other.

Example 3

In a further experiment, the coating solution of Example 2 was used to coat additional 4 cm² titanium foil samples. Varying current densities and exposure times were examined and capacitance and ESR values were obtained immediately after coating and after rinses with acetone and methanol and a 60 minute oven dry, as shown in Table 3A below. Nitrogen was bubbled during coating.

TABLE 3A

| Current Density (mA/cm²) | Exposure Time (min) | Measurement | Capacitance (mF) | ESR (Ω) |
| --- | --- | --- | --- | --- |
| 0.5 | 10 | Initial | 10.9 | 6.3880 |
| 0.5 | 10 | After rinse and 60 min. oven dry | 8.23 | 6.2021 |
| 0.5 | 15 | Initial | 13.5 | 5.7730 |
| 0.5 | 15 | After rinse and 60 min. oven dry | 10.92 | 5.8454 |
| 1.0 | 10 | Initial | 12.2 | 6.5844 |
| 1.0 | 10 | After rinse and 60 min. oven dry | 11.0 | 6.2670 |
| 1.0 | 15 | Initial | 15.0 | 5.9170 |
| 1.0 | 15 | After rinse and 60 min. oven dry | 10.69 | 5.9032 |
| 1.5 | 10 | Initial | 15.4 | 6.6758 |
| 1.5 | 10 | After rinse and 60 min. oven dry | 13.4 | 5.8000 |
| 1.5 | 15 | Initial | 13.8 | 6.7371 |
| 1.5 | 15 | After rinse and 60 min. oven dry | 10.35 | 6.0148 |

The polymer cathode samples from Examples 2 and 3 were stored in a 65° C. oven for five days. After storage, the capacitance and ESR of the samples were again measured, as shown in Table 3B below.

TABLE 3B

| Treatment/Current Density | Exposure Time (min) | Days Since Coating | Capacitance (mF) | ESR (Ω) |
| --- | --- | --- | --- | --- |
| Galvanic Square Wave (Example 2) | n/a | 7 | 3.824 | 4.3104 |
| 0.5 mA/cm² (Example 2) | 15 | 7 | 4.000 | 3.9804 |
| 0.5 mA/cm² | 10 | 5 | 2.357 | 4.4652 |
| 0.5 mA/cm² | 15 | 5 | 4.803 | 4.3340 |
| 1.0 mA/cm² | 10 | 5 | 6.09 | 4.3442 |
| 1.0 mA/cm² | 15 | 5 | 4.909 | 3.6626 |
| 1.5 mA/cm² | 10 | 5 | 9.35 | 4.1027 |
| 1.5 mA/cm² | 15 | 5 | 7.28 | 4.3567 |

Example 4

Different coating results were observed with different titanium foil samples (a grade 1 titanium sample, a grade 2 titanium sample, and a titanium sample from Strem Chemicals, Inc., Newburyport, Mass.). The grade 2 titanium sample exhibited poor adherence, while the Strem sample did coat but not as evenly as the grade 1 titanium sample.

In a further experiment, a surfactant was added to the coating solution for improved adherence. A small amount of dioctyl sulfosuccinate sodium salt was added to the solution. After addition of the surfactant, all three titanium samples coated evenly without a washing step. Each sample was 1 cm by 7 cm in size and coated with an applied current of 1.8 mA for 9 minutes.

The capacitance and ESR of the samples produced were measured (after about 16 hours), as shown in Table 4 below. Samples were stored in a 60° C. oven overnight.

TABLE 4

| Titanium Foil | Capacitance (mF) | ESR (Ω) |
| --- | --- | --- |
| Grade 1 Ti, no washing | 8.61 | 2.1913 |
| Grade 1 Ti, acetone wipe | 7.24 | 2.1687 |
| Strem Ti, no washing | 9.69 | 2.2939 |
| Strem Ti, acetone wipe | 8.62 | 2.1662 |
| Grade 2 Ti, no washing | 9.61 | 2.1691 |

All of the samples obtained a good coating, but those without a washing step appeared more even and uniform.

Example 5

A solution of 5.6 g malic acid, 2.0 g p-toluene sulfonic acid and 160.0 g water was mixed with an aqueous solution of 0.50 g dioctyl sulfosuccinate (0.25%) and 1.0 g EDOT in 40 g acetonitrile.

Aluminum foil samples (10 cm²) were coated with the mixture at a current density of 0.26 mA/cm² for 9 minutes and 0.13 mA/cm² for 18 minutes. An even coating of the film was produced.

Example 6

A solution of 2.8 g malic acid, 1.0 g p-toluene sulfonic acid, 95 g water and 0.1 g dioctyl sulfosuccinate (surfactant) were mixed and added to 1 g EDOT monomer in 5 g acetonitrile. Two coupons (3.5 cm×4 cm) of aluminum foil were coated with the solution, one at 0.26 mA/cm² for 9 minutes and the other at 0.13 mA/cm² for 18 minutes. Both foils coated fairly evenly with a milky blue coating. The sample coated for 18 minutes appeared to have a more even coating.

The following results were observed: the coating at 0.26 mA/cm² for 9 minutes achieved a capacitance of 15.64 mF and an ESR of 1.2290Ω and the coating at 0.13 mA/cm² for 18 minutes achieved a capacitance of 18.36 mF and an ESR of 1.2112 Ω.

Two coupons (2 cm×4 cm) of 85 micron aluminum were then coated with the solution. One sample was coated at 0.26 mA/cm² for 9 minutes and the other was coated at 0.13 mA/cm² for 18 minutes. The coating for the strip at 0.26 mA/cm² for 9 minutes had an uneven coating. The coupon coated at 0.13 mA/cm² for 18 minutes also coated but had a streaky coating.

The following results were observed: the coating at 0.26 mA/cm² for 9 minutes achieved a capacitance of 4.912 mF and an ESR of 3.3200Ω and the coating at 0.13 mA/cm² for 18 minutes achieved a capacitance of 5.08 mF and an ESR of 3.1630 Ω.

A grade 2 titanium sample and two titanium samples from Strem Chemicals, Inc., Newburyport, Mass., were also coated with the solution. All samples were 2 cm×4 cm in size. The grade 2 titanium sample was coated for 18 minutes at 0.13 mA/cm². The two Strem titanium samples were also coated, one at 0.26 mA/cm² for 9 minutes and one at 0.13 mA/cm² for 18 minutes. The grade 2 titanium sample coated fairly evenly but had a light coating. Coating was also slightly streaky. Both samples of Strem titanium coated evenly but the lower current density (0.13 mA/cm$^2$ for 18 minutes) application seemed to produce a slightly more even coating.

The following results were observed: the coating of the Grade 2 Ti at 0.13 mA/cm$^2$ for 18 minutes achieved a capacitance of 15.51 mF and an ESR of 2.2638Ω, the coating of the Strem Ti at 0.13 mA/cm$^2$ for 18 minutes achieved a capacitance of 15.76 mF and an ESR of 2.0116Ω and the coating of the Strem Ti at 0.26 mA/cm$^2$ for 9 minutes achieved a capacitance of 13.43 mF and an ESR of 2.0985 Ω.

Example 7

A coating solution utilizing 1-propanol in place of acetonitrile was examined. A solution of 2.8 g malic acid, 1.0 g p-toluene sulfonic acid and 80 g water was mixed and combined with 1.0 g EDOT, 0.1 g dioctyl sulfosuccinate in 20 g 1-propanol. A 2 cm×4 cm coupon of grade 1 titanium was coated with this solution at 0.26 mA/cm$^2$ for 9 minutes. The coating was fairly even and uniform. The coating achieved a capacitance of 18.40 mF and an ESR of 2.1189 Ω.

The same 80/20 water/1-propanol solution was used to coat a grade 2 titanium foil from Eagle Alloys Corp. of Talbot, Tenn. An uncleaned 2 cm×4 cm sample was coated at 0.26 mA/cm$^2$ for 9 minutes and an uneven streaky coating resulted. A different 2 cm×4 cm sample was wiped with acetone and coated for 9 minutes at 0.26 mA/cm$^2$. That sample had a slightly more even coating but was still streaky. A different uncleaned 2 cm×4 cm sample was coated at 0.13 mA/cm$^2$ for 18 minutes and a more even but still streaky coat resulted. Finally, a cleaned (acetone wiped) 2 cm×4 cm sample was coated at 0.13 mA/cm$^2$ for 18 minutes and had the most even and non-streaky coating of the four samples.

The following results were observed: the coating of the uncleaned sample at 0.26 mA/cm$^2$ for 9 minutes achieved a capacitance of 16.37 mF and an ESR of 2.3097Ω. The coating of the acetone wiped sample at 0.26 mA/cm$^2$ for 9 minutes achieved a capacitance of 16.40 mF and an ESR of 2.2890Ω. The coating of the uncleaned sample at 0.13 mA/cm$^2$ for 18 minutes achieved a capacitance of 16.97 mF and an ESR of 2.1325Ω. The coating of the acetone wiped sample at 0.13 mA/cm$^2$ for 18 minutes achieved a capacitance of 16.97 mF and an ESR of 2.2617Ω.

Example 8

To determine if other alcohols could also be useful in coating, a solution of 2.8 g malic acid, 1.0 g p-toluene sulfonic acid and 80 g water was mixed and combined with 1.0 g EDOT, 0.1 g dioctyl sulfosuccinate in 20 g 1-butanol.

A 2 cm×4 cm strip of grade 1 titanium was coated at 0.26 mA/cm$^2$ for 9 minutes. The top of the sample did not coat well but the bottom had an even, uniform coating. The coating achieved a capacitance of 9.96 mF and an ESR of 2.4700Ω.

A sample of Eagle grade 2 titanium (8 cm$^2$) was coated for 9 minutes at 0.26 mA/cm$^2$. The sample was not cleaned before coating. The coating was heavier on the bottom portion of the coupon, but uneven and spotty over the whole surface. The coating achieved a capacitance of 8.40 mF and an ESR of 2.4271Ω.

Example 9

A solution consisting of 2.8 g malic acid, 1.0 g p-toluene sulfonic acid and 80 g water was mixed and combined with 1.0 g EDOT, 0.1 g dioctyl sulfosuccinate in 20 g 1-propanol. A 2 cm×2 cm coupon was coated at 0.47 mA/cm$^2$ for 5 minutes. The coupon coated uniformly and had a capacitance of 8.28 mF.

4 cm$^2$ coupons of uncleaned grade 1 titanium were coated at various temperature between about 0° C. and 50° C. to determine if temperature had an effect on the ability of solution to coat. Upon chilling the solution in an ice bath, a white cloudy layer appeared at the bottom of the beaker. The solution was therefore stirred throughout coating at each temperature to ensure that everything stayed in solution. Each coupon was coated at 0.47 mA/cm$^2$ for 5 minutes.

At a temperature of 2° C., a very even and uniform coating was produced with no streakiness. A capacitance of 9.82 mF and an ESR of 3.4305Ω were observed.

At a temperature of 12° C., a very even and uniform coating was also produced with no streaks. A capacitance of 9.89 mF and an ESR of 4.0298Ω were observed. At 12° C., the solution was again clear (not cloudy as at 2° C.) but some EDOT would not stir back into the solution. Stirring was continued throughout coating.

At 23° C., a very even and uniform coating was produced with no streaks. EDOT remained on the bottom of beaker and would not stir back into solution. A capacitance of 10.86 mF and an ESR of 3.5897Ω were observed.

At 32° C. a very even and uniform coating was produced with no streak areas. Some EDOT remained on the bottom of the beaker and would not go back into solution. A capacitance of 9.20 mF and an ESR of 3.7068Ω were observed.

EDOT fully went back into solution with stirring at 38° C.

At 42° C., a very even and uniform coating with no streaky areas was produced. A capacitance of 8.92 mF and an ESR of 3.5903Ω were observed.

At 52° C., a slightly streaky coating was produced. A capacitance of 7.48 mF and an ESR of 3.7212Ω were observed.

Example 10

Three different temperatures were evaluated for coating ability, a cooled temperature of about 10° C., room temperature (approximately 22° C.) and a heated temperature of about 33° C. Solutions were maintained at the desired temperature all day and 6 cm$^2$ samples were coated once an hour. Three 100 ml coating solutions were prepared, each consisting of 2.8 g malic acid, 1.0 g p-toluene sulfonic acid and 80 g water mixed and combined with 0.5 g EDOT, 0.1 g dioctyl sulfosuccinate in 20 g acetonitrile. All samples were coated at 0.3 mA/cm$^2$ (1.8 mA) for 7 minutes, 45 seconds. Capacitance and ESR measurements were taken initially and after one day later, as shown in Table 5A, below.

TABLE 5A

| Hour | Temp (° C.) | Initial Cap. (mF) | Initial ESR (Ω) | Cap. after one day (mF) | ESR after one day (Ω) | Comments on Coating |
|---|---|---|---|---|---|---|
| 0 | 33 | 11.07 | 2.6976 | 6.70 | 2.7355 | Very even and uniform blue coat |
| 0 | 3.1 | 7.63 | 2.7630 | 4.498 | 2.9659 | Very slightly streaky blue coat |

TABLE 5A-continued

| Hour | Temp (°C.) | Initial Cap. (mF) | Initial ESR (Ω) | Cap. after one day (mF) | ESR after one day (Ω) | Comments on Coating |
|---|---|---|---|---|---|---|
| 0 | 21.7 | 11.11 | 2.8434 | 6.31 | 2.6690 | Very even and uniform blue coat |
| 1 | 33 | 11.06 | 2.4445 | 5.71 | 2.9327 | Very even and uniform blue coat |
| 1 | 2.1 | 8.37 | 2.6418 | 4.803 | 2.9970 | Very slightly streaky blue coat |
| 1 | 21.5 | 10.85 | 2.7337 | 7.05 | 2.7674 | Very even and uniform blue coat |
| 2 | 33 | 11.04 | 2.6935 | 5.40 | 2.7263 | Very even and uniform blue coat |
| 2 | 3.3 | 7.93 | 2.7282 | 5.17 | 2.7634 | Slightly streaky blue coat |
| 2 | 22.0 | 11.59 | 2.7049 | 7.40 | 2.7243 | Very even and uniform blue coat |
| 3 | 33 | 11.15 | 2.8080 | 5.26 | 3.0507 | Very even and uniform blue coat; distinct blue/green color in solution, still clear |
| 3 | 8.7 | 8.42 | 2.8667 | 5.12 | 2.9068 | Very even and uniform blue coat |
| 3 | 21.9 | 11.80 | 2.8193 | 6.00 | 2.8306 | Very even and uniform blue coat |
| 4 | 33 | 10.43 | 2.8114 | 5.58 | 3.1554 | Even and uniform blue coat; solution less clear, distinct blue/green color |
| 4 | 1.8 | 7.65 | 2.8786 | 4.924 | 3.1199 | Darker areas present on coating; solution white and cloudy |
| 4 | 21.5 | 11.68 | 2.7666 | 6.10 | 3.0963 | Very even and uniform blue coating |
| 5 | 33 | 12.15 | 2.8121 | 7.59 | 2.8974 | slightly streaky blue coating; solution is blue and opaque |
| 5 | 1.6 | 8.64 | 2.9547 | 4.708 | 3.1378 | Slightly streaky coating; darker areas present on coating; solution is cloudy and gray |
| 5 | 21.1 | 11.91 | 2.6838 | 6.26 | 2.8871 | Very even and uniform blue coating; solution is clear and yellow tinted |
| 6 | 33 | 11.75 | 2.9078 | 7.40 | 3.0222 | Streaky coating; lighter blue; darker areas present on coating; solution is opaque and blue |
| 6 | 1.7 | 9.61 | 2.7148 | 6.02 | 3.1362 | Streaky light blue coating; darker areas present, solution is opaque and gray with white spots |
| 6 | 21.1 | 12.24 | 2.6941 | 7.00 | 2.6221 | Very even and uniform blue coating; solution is clear and yellow |

All temperature study coating solutions were stored overnight in refrigeration. The next day coating ability was examined both at the temperature examined previously and at room temperature, as shown in Table 5B, below. The chilled solution was opaque and gray with white spots; the heated solution was opaque and an intense blue color; and the room temperature solution was clear and had a bluish tint.

TABLE 5B

| Sample | Temp (°C.) | Cap. (mF) | ESR (Ω) | Comments on Coating |
|---|---|---|---|---|
| Cooled, after one day | 3.3 | 8.76 | 2.9327 | Streaky coating |
| Room, after one day | 21.1 | 9.83 | 2.9563 | Even and uniform blue coating |
| Heated, after one day | 33 | 8.80 | 2.7304 | Slightly streaky coating |
| Cooled, after one day, at room temp. | 23.8 | 8.07 | 3.0686 | Slightly streaky coating |
| Room, after one day, at room temp. | 22.7 | 10.37 | 2.8671 | Very slightly streaky blue coating |
| Heated, after one day, at room temp. | 24.6 | 5.65 | 2.9977 | Streaky coating with dark areas |

Coating with the chilled solution still appeared to fairly even. Coating with the room temperature solution was still even and consistent. The heated solution appeared to be losing its coating ability.

Example 11

A study was performed on the effects of varying phosphoric acid concentrations in solution. Grade 2 titanium foils were coated with a variety of concentrations, as shown below in Table 6. For all solutions, the following concentrations were held constant: 2.8% by weight malic acid, 0.5% by weight EDOT, 80% by weight deionized water, 20% by weight acetonitrile. Coated samples were 24.5 cm$^2$ and coated at 0.26 mA/cm$^2$ for 9 minutes. Samples were measured in parallel to obtain capacitance and ESR measurements.

TABLE 6

| $H_3PO_4$ conc. | Cap. (mF) | ESR (Ω) | Comments on coating |
|---|---|---|---|
| 1% | 14.44 | 3.0671 | Coating is even and uniform, medium blue color; rainbow color when dry |
| 2% | 18.26 | 3.222 | Coating is even and uniform, medium blue color; slight rainbow effect when dry |
| 3% | 18.55 | 3.1989 | Coating is even and uniform, dark blue color; dark blue when dry |
| 4% | 18.97 | 2.6817 | Coating is even and uniform and very dark blue; very dark blue when dry |
| 5% | 18.75 | 2.8387 | Coating is even and uniform, dark blue in color; dark blue when dry |
| 10% | 19.1 | 3.5103 | Coating is even and uniform, dark blue in color |

The 10% phosphoric acid PEDOT coating solution was left at room temperature overnight and coating was then attempted. The solution would not coat a 3.5 cm×7 cm foil sample. Coating was very uneven and streaky.

Example 12

A 4 L batch of the PEDOT coating solution containing 3% $H_3PO_4$ was prepared. The solution contained 112 g malic acid (2.8% by weight), 120 g $H_3PO_4$ (3% by weight) and 3200 ml deionized water, mixed and combined with 20 g EDOT (0.5% by weight) and 800 ml acetonitrile.

This solution was used to coat long strips of grade 2 titanium that had been precleaned in a 10% SIMPLE GREEN in water solution. The grade 2 titanium strip size is 10.1 cm by 22.0 cm (222.2 $cm^2$) and a current of 0.26 $mA/cm^2$ (57.8 mA) was applied to each for 9 minutes. The titanium coated evenly and uniformly but was less consistent if bends were present in the foil.

After coating, foils were post cleaned with a five minute soak in 10% ammonium bicarbonate in water.

Samples, each 6 $cm^2$, were cut from the coated, rinsed foil and capacitance and ESR were measured, as shown in Table 7, below.

TABLE 7

| Foil sample | Capacitance (mF) | ESR (Ω) |
|---|---|---|
| 1 | 9.88 | 2.7665 |
| 2 | 9.72 | 2.8085 |
| 3 | 10.02 | 2.7543 |
| 4 | 10.50 | 2.6684 |

Example 13

A 100 ml solution of PEDOT coating solution with 3% phosphoric acid was prepared and was left at room temperature to determine how long the solution would be able to coat. Capacitance and ESR were measured in parallel, as shown below in Table 8. Grade 2 titanium coupon size was 3.5 cm by 7 cm.

TABLE 8

| | Capacitance (mF) | ESR (Ω) |
|---|---|---|
| Day 0: Cathode coated even and uniformly | | |
| Before $NH_4HCO_3$ rinse | 24.9 | 3.1734 |
| After $NH_4HCO_3$ rinse | 23.8 | 3.6902 |
| Next Day | 21.9 | 2.9623 |
| 48 hours | 21.1 | 2.6630 |
| Day 1: Cathode coated but was streaky and uneven on one side | | |
| Before $NH_4HCO_3$ rinse | 16.58 | 3.1469 |
| After $NH_4HCO_3$ rinse | 16.86 | 3.5067 |
| Next Day | 13.43 | 3.2275 |
| Day 2: Coating is very uneven and streaky; some areas did not coat at all | | |
| Before $NH_4HCO_3$ rinse | 14.70 | 3.0001 |
| After $NH_4HCO_3$ rinse | 13.73 | 3.0257 |

Example 14

A 2% $H_3PO_4$ PEDOT coating solution was prepared to examine the life of a solution stored at room temperature. Solution composition was 2.8 g malic acid (2.8% by weight), 2.0 g $H_3PO_4$ (2.0% by weight) and 80 g deionized water mixed and combined with 0.5 g EDOT (0.5% by weight) and 20 g acetonitrile.

Capacitance and ESR were measured in parallel, as shown below in Table 9. Coupon size was 3.5 cm×7 cm and the coupons were cleaned with a 10% SIMPLE GREEN solution prior to coating. Coating was at 0.26 $mA/cm^2$ for 9 minutes.

TABLE 9

| | Capacitance (mF) | ESR (Ω) |
|---|---|---|
| Day 0: Coating was slightly uneven, not as good as the 3% $H_3PO_4$ solution; coating was dark blue. | | |
| Before $NH_4HCO_3$ rinse | 19.47 | 3.1118 |
| After $NH_4HCO_3$ rinse | 19.26 | 3.2313 |
| Day 4: Foil samples would not coat with the solution. After addition of another 0.5% EDOT by weight, the solution still would not coat grade 2 titanium strips. | | |

Example 15

A PEDOT coating solution with 2.5% $H_3PO_4$ was mixed and stored at room temperature. The solution contained 2.8 g malic acid, 2.5 g $H_3PO_4$ and 80 g deionized water mixed and combined with 0.5 g EDOT and 20 g acetonitrile. Capacitance and ESR were measured in parallel as shown below in Table 10.

TABLE 10

| | Capacitance (mF) | ESR (Ω) |
|---|---|---|
| Day 0: Coating was dark blue and not quite as even as 3% $H_3PO_4$ | | |
| Before $NH_4HCO_3$ rinse | 16.92 | 2.9742 |
| After $NH_4HCO_3$ rinse | 18.29 | 3.0891 |
| Day 1: Coating was fairly even but a lighter blue than day 0 | | |
| Before $NH_4HCO_3$ rinse | 19.16 | 2.6449 |
| After $NH_4HCO_3$ rinse | 18.09 | 2.9322 |
| Day 2: Coating was uneven and streaky | | |
| Before $NH_4HCO_3$ rinse | 17.54 | 2.7818 |
| After $NH_4HCO_3$ rinse | 15.34 | 2.8896 |

Example 15

To improve the life span of the PEDOT coating solution at room temperature, two solutions containing the following were prepared: 2.8 g malic acid, 3.0 g $H_3PO_4$ and 80 g deionized water mixed and combined with 0.5 g EDOT and 20 g acetonitrile.

One solution was used to coat and held at room temperature and the other was used to coat, flushed with nitrogen gas, then stored at room temperature.

Cleaned titanium foils of size 3.5 cm×7 cm were coated for 9 minutes at 6.4 mA (0.26 $mA/cm^2$). Two foils were coated daily for each solution then rinsed for 5 minutes in a 5% ammonium bicarbonate solution then rinsed with water. Capacitance and ESR were measured in parallel, as shown below in Table 11.

TABLE 11

| Sample | Capacitance (mF) | ESR (Ω) | Comments on Coating |
|---|---|---|---|
| Day 0, no $N_2$ flush (23.1 C) | 22.7 | 2.4376 | Foils coated evenly |
| Day 0, $N_2$ flush (23.1 C) | 22.2 | 2.8155 | Even, uniform coat |
| Day 1, no $N_2$ flush (22.2 C) | 20.9 | 2.6915 | Even coating |
| Day 1, $N_2$ flush (22.2 C) | 21.7 | 2.6822 | Coating somewhat streaky |

TABLE 11-continued

| Sample | Capacitance (mF) | ESR (Ω) | Comments on Coating |
|---|---|---|---|
| Day 4, no N₂ flush (22.6 C) | 0.9999 | 5.5028 | Very uneven and streaky coating |
| Day 4 N₂ flush (22.6 C) | 0.9614 | 4.4447 | Very uneven coating |

Example 16

To examine the optimum storage condition of the PEDOT coating solution with 3% $H_3PO_4$, several storage conditions were examined. Four solutions containing the following were prepared: 2.8 g malic acid, 3.0 g $H_3PO_4$ and 80 g deionized water mixed and combined with 0.5 g EDOT and 20 g acetonitrile.

Four storage conditions were examined: (A) room temperature, no gas flush; (B) room temperature, with $N_2$ gas flush, (C) refrigeration, no gas flush, and (D) refrigeration, with $N_2$ gas flush.

Foils precleaned with SIMPLE GREEN, of size 3.5 cm×7 cm will be coated daily with the solutions until they are exhausted. Two grade 2 titanium foils will be coated with each solution and capacitance and ESR were measured in parallel, as shown below in Table 12. Prior to measurement, foils will be rinsed for five minutes in a 5% ammonium bicarbonate solution.

TABLE 12

| Sample | Temp (° C.) | Capacitance (mF) | ESR (Ω) | Comments on coating |
|---|---|---|---|---|
| Day 0: All coating solutions produced an even, uniform coating on foil samples. | | | | |
| A | 23.1 | 17.92 | 2.8143 | Even and uniform |
| B | 23.1 | 17.95 | 2.7083 | Even and uniform |
| C | 23.1 | 20.7 | 2.8574 | Even and uniform |
| D | 23.1 | 21.1 | 2.5866 | Even and uniform |
| Day 1: The coating solutions flushed with nitrogen did not coat as well as those that were not flushed with nitrogen. The solutions that had been refrigerated were better at coating than those held at room temperature. Solutions that had been refrigerated were allowed to reach room temperature before foils were coated. Before being examined for capacitance and ESR all foils were rinsed for 5 min in a 5% ammonium bicarbonate solution. | | | | |
| A | 24.4 | 16.86 | 1.9442 | Coating fairly even, some streakiness present |
| B | 24.3 | 15.58 | 2.9158 | Coating splotchy; some areas have dark coating, others left bare titanium |
| C | 25.2 | 16.68 | 2.7544 | Coating is even and uniform |
| D | 25.0 | 15.16 | 4.0662 | Mostly even coating, a few areas of bare titanium |
| Day 2: the coating solutions stored at room temperature did not coat at all evenly or uniformly. Those stored in the refrigerator coated fairly evenly. The solutions stored at low temperature were allowed to reach room temperature before coating | | | | |
| A | 22.2 | 5.42 | 3.5188 | Coating very uneven and splotchy; coating was nearly one sided. |
| B | 23.1 | 5.01 | 3.1235 | Coating very uneven and splotchy. Nearly one sided coating. Slightly darker than no N₂ flush. |
| C | 22.1 | 19.20 | 2.9688 | Coating very even and uniform |
| D | 22.9 | 23.7 | 2.2209 | Coating very even and uniform |
| Day 3: Only the solutions that had been refrigerated were used to coat foils because solutions held at room temperature did not coat effectively on day 2. Both solutions (C) and (D) coated evenly with a few areas of splotchiness. Both solutions coated very similarly. | | | | |
| C | 25.0 | 16.50 | 3.1086 | Coating very blue, fairly even, some splotchy areas |
| D | 25.9 | 22.1 | 3.3123 | Coating very blue, fairly even, some splotchy areas |
| Day 4: Again, only the solutions that had been refrigerated (C and D) were used to coat foils. Solutions were allowed to reach room temperature before being used for coating. The solution that was not flushed with nitrogen still coated evenly and uniformly. The solution that was flushed with nitrogen did not coat as evenly but did still coat. | | | | |
| C | 24.3 | 18.86 | 3.3925 | Coating is even and uniform |
| D | 24.0 | 12.80 | 4.2715 | Parts of coating are even but parts are splotchy. Areas of raw titanium are visible. |
| Day 7: Only the solutions that had been stored at refrigeration (C and D) were used to coat foils. Solutions were allowed to reach room temperature before being used for coating. The solution that was not flushed with nitrogen coated but was spotty. The solution that was flushed with nitrogen coated somewhat evenly on one side and barely coated at all on the other side. Foils were rinsed with 5% ammonium bicarbonate before capacitance and ESR were tested. | | | | |
| C | 25.5 | 12.99 | 3.4408 | Dark blue coating with areas of spots and splotchiness |
| D | 25.1 | 7.84 | 3.5971 | Dark blue coating with areas of splotchiness. One side coats significantly better than the other. |
| Day 8: Only solutions C and D were tested. They were brought to room temperature before being used to coat foils. Both solutions coated very unevenly on one side and somewhat evenly on the other side. The samples coated with the solution that had not been flushed with nitrogen had a slightly better coating than the ones that had been nitrogen flushed. Since neither solution coated very well, this was the last day the solutions were used for coating. | | | | |
| C | 24.6 | 12.38 | 2.8646 | Dark blue coating some what even on one side, very uneven on other side. |
| D | 24.4 | 6.82 | 3.4782 | Fairly uneven on one side, very uneven on other side |

Example 17

A number of coating solutions with alternatives for phosphoric acid ($H_3PO_4$) were produced.

A solution containing the following was prepared: 2.8 g malic acid, 35 g ammonium dihydrogen phosphate (5% by weight) and 80 g deionized water mixed and combined with 0.5 g EDOT and 20 g acetonitrile. The solution was used to coat two 3.5 cm×7 cm samples at 0.26 mA/cm² for 9 minutes. The coating produced was gold in color. Foils were measured in parallel and a capacitance of 37.229 μF and an ESR of 9.997Ω were observed.

A solution containing the following was prepared: 2.8 g malic acid, 10 g hypophosphorous acid (5% by weight) and 80 g deionized water mixed and combined with 0.5 g EDOT and 20 g acetonitrile. The solution was used to coat two 3.5 cm×7 cm samples at 0.26 mA/cm² for 9 minutes. The coating was uneven and spotty and dark blue in color. Foils were measured in parallel and a capacitance of 24.9 mF and an ESR of 2.8791Ω were observed.

A solution containing the following was prepared: 2.8 g malic acid, 5 g sodium phosphate (5% by weight) and 80 g deionized water mixed and combined with 0.5 g EDOT and 20 g acetonitrile. The solution was used to coat two 3.5 cm×7 cm samples at 0.26 mA/cm² for 9 minutes. The coating produced was gold in color. Foils were measured in parallel and a capacitance of 46.062 µF and an ESR of 11.40Ω were observed A solution containing the following was prepared: 2.8 g malic acid, 2.5 g boric acid (2.5% by weight) and 80 g deionized water mixed and combined with 0.5 g EDOT and 20 g acetonitrile. The 25 g of boric acid was added to the 80 g deionized water and the solution was heated on low heat and stirred until all boric acid went into solution. After the boric acid went in solution, the solution was allowed to cool before the remaining chemicals were added. The solution was used to coat two 3.5 cm×7 cm samples of precleaned titanium at 0.26 mA/cm² for 9 minutes. The foils had a fairly even coating but were somewhat spotty. Foils were measured in parallel and a capacitance of 23.3 mF and an ESR of 3.1269Ω were observed Two additional 3.5 cm×7 cm strips of precleaned titanium were coated with the solution at 0.52 mA/cm² for 9 minutes. These foils had an even coating and a darker color. Foils were measured in parallel and a capacitance of 30.8 mF and an ESR of 2.8578Ω were observed A solution containing the following was prepared: 2.8 g malic acid, 2.5 g sodium tetraborate decahydrate and 80 g deionized water mixed and combined with 0.5 g EDOT and 20 g acetonitrile. This solution would not coat precleaned titanium strips.

Example 18

To determine the optimum amount of boric acid in the solution for coating, various mixtures were made of the following compositions: 2.8 g malic acid, varying concentrations of boric acid (1%, 2%, 3%, 4% and 5%) and 80 g deionized water, mixed and combined with 0.5 g EDOT and 20 g acetonitrile.

For each solution, pH of the solution was measured and two strips of precleaned grade 2 titanium, 3.5 cm×7 cm (24.5 cm²), were coated in each solution. Coating was performed at room temperature. All pH measurements were taken after two strips of titanium were coated. In each solution, two precleaned strips of titanium were coated at 0.40 mA/cm² for 9 minutes (9.8 mA). The strips were rinsed in a 5% ammonium bicarbonate solution for 5 minutes before capacitance and ESR were measured, as shown below in Table 13. Two strips were coated in each solution and measurements were made in parallel.

TABLE 13

| Boric Acid in Solution | pH | Capacitance (mF) | ESR (Ω) | Comments on coating |
|---|---|---|---|---|
| 1% | 1.99 | 19.87 | 2.2395 | Dark blue-black coating, fairly even, a few spotty areas |
| 2% | 1.87 | 20.5 | 2.4876 | Dark blue-black coating, fairly even, a few spotty areas. Not quite as uniform as 1% |
| 3% | 1.75 | 21.3 | 1.7887 | Dark blue-black coating, fairly even, very few spotty areas |
| 4% | 1.77 | 17.81 | 2.5641 | Very dark blue-black coating, fairly even with very few spotty areas |

TABLE 13-continued

| Boric Acid in Solution | pH | Capacitance (mF) | ESR (Ω) | Comments on coating |
|---|---|---|---|---|
| 5% | 1.74 | 20.2 | 1.9761 | Very dark blue-black coating, somewhat even with several areas of spottiness, less even than other coatings |

The 1%, 3% and 4% boric acid solutions seemed to have the best coating at 0.40 mA/cm². Capacitance was fairly steady for all solution coatings.

Example 19

A study on different cleaning steps for titanium foil was conducted to determine if different cleaning steps resulted in differing levels of adhesion to the foil. A solution consisting of p-toluene sulfonic acid, malic acid and EDOT monomer in methanol, water and acetonitrile, as discussed above, was used to coat the samples.

Two samples were treated with each cleaning step shown in Table 14A below. Each treatment received a five minute rinse after cleaning.

TABLE 14A

| Treatment | Results |
|---|---|
| 2 minute boil in 5% Oxalic Acid | Coated on one side, very unevenly on other side. Coating wiped away with glove. |
| 5 minute soak in Acetone | Streaky coating on both sides; more uniform than most. |
| 5 minute soak in 1 N sodium hydroxide | Streakier coating on one side; fairly even on other side. |
| 5 minute soak in 7% Nitric Acid | Streaky coating on both sides; both sides have similar amount of coating. |
| 5 minute soak in 10% Sulfuric Acid | Very streaky coating on one side, even coating on other side. |
| Wiped with Acetone, then 5 minute soak in Acetone | Even coating on both sides, no pronounced streaking. |
| Control (no cleaning step) | Uneven coating (streaky) on both sides. |

As shown above, wiping the foil samples with acetone provided the best results. Further testing showed that wiping with acetone without a water rinse gave a more even coating.

Further, a variety of precleaning steps were examined to determine which, if any, give a consistently good substrate for the polymer coating. Grade 1 and grade 2 titanium were cleaned. 26 cm long strips were cut from each type of titanium and the strips were cut in half, width wise. The grade 1 strips were cut into two 1.75 cm strips and the grade 2 strips were cut into two 5.1 cm strips. For each pair of strips one side remained uncleaned (control) and the other was exposed to the assigned pretreatment. Following all treatments, the foils were rinsed in deionized water for five minutes. After the precleaning the foils appeared similar to their control counterparts except the oxalic acid preclean. The oxalic preclean darkened the titanium after a five minute preclean.

Following the preclean steps, the foils were coated with a PEDOT solution. The coating solution was composed of the following: 98 g malic acid (2.8% by weight), 105 g phosphoric acid (3.0% by weight) and 2625 g water (75% by weight) mixed and combined with 17.5 g EDOT (0.5% by weight) and 654.5 g acetonitrile (18.7% by weight). Pairs of foils were coated at 0.28 mA/cm² for 9 minutes (60 mA for grade 2 foils and 20 mA for grade 1 foils). Solution was kept between 21° C. and 22° C. for the entire coating process. Coating results are shown below in Table 14B.

TABLE 14B

| Treatment | Results |
|---|---|
| 5 minute soak in 10% SIMPLE GREEN | Control coating more streaky than treated; surface oil present in control may have resulted in areas that did not coat |
| 5 minute boil in 5% oxalic acid | Treated foils had a very streaky coating. Control foils had a few spotty areas. |
| 5 minute boil in 5% citric acid | Treated foils had a more even coating than control; surface oil present in control may have resulted in areas that did not coat |
| 5 minute boil in 5% acetic acid | Treated foils had a more even coating than control; surface oil present in control may have resulted in areas that did not coat |
| 5 minute boil in 5% formic acid | Very even coating on treated foils; treated foils had a more even coating than control; surface oil present in control may have resulted in areas that did not coat |

Example 20

A solution consisting of 50 g NaOH and 500 g deionized water was prepared to surface treat titanium strips. The solution was heated to between 90° C. and 100° C. and titanium foils were submerged for 1 minute, 2 minutes and 5 minutes.

A grade 2 foil was cleaned for 5 minutes and grade 1 foils were cleaned for 1 and 2 minutes. All foils were cut in half and one half was exposed to treatment and the other was held as a control. All the sodium hydroxide precleaned strips showed surface changes. The five minute grade 2 foil was gold colored on both sides. Both the one and two minute grade 1 foils were gold colored on one side and did not appear to undergo a surface change on the other side. Strips were coated in pairs (treated and control).

In the grade 1 foil cleaned for 1 minute, the side that turned gold in color did not coat while the side that did not have a changed appearance coated evenly. The control strip coated on both sides.

In the grade 1 foil cleaned for 2 minutes, the side of the treated strip that turned gold in color did not coat while the side that did not have a changed appearance coated evenly. The control strip coated on both sides.

In the grade 2 foil coated for 5 minutes, the treated strip did not coat evenly on either side. Both sides were very streaky. The control strip coated fairly evenly on both sides.

Example 21

To determine if different additives can improve the adhesion of PEDOT to titanium, two solutions were tested. The first consisted of: 98 g malic acid (2.8% by weight), 3.0 g phosphoric acid (3.0% by weight) and 74.9 g water (74.9% by weight) mixed and combined with 0.5 g EDOT (0.5% by weight), 0.1 g dioctyl sulfosuccinate (0.1%) and 18.7 g acetonitrile (18.7% by weight). The second consisted of: 98 g malic acid (2.8% by weight), 3.0 g phosphoric acid (3.0% by weight) and 74.6 g water (74.6% by weight) mixed and combined with 0.5 g EDOT (0.5% by weight), 0.5 g 3-glycidoxypropyltrimethoxysilane (0.5%) and 18.6 g acetonitrile (18.6% by weight). Additionally, a 1% silane in alcohol solution was prepared to use as a pretreat for titanium. To prepare this solution, 2 g of silane were added to 198 g ethanol.

Samples of grade 2 titanium (6 $cm^2$) were precleaned with a 10% SIMPLE GREEN solution. Samples were cleaned for five minutes then rinsed in deionized water. After samples were cleaned they were coated with either solution 1 or 2 or pretreated with a 5 minute soak in a 1% silane in alcohol solution before being coated with a standard coating solution containing 2.8 g malic acid, 3.0 g phosphoric acid and 75 g water mixed and combined with 0.5 g EDOT and 18.7 g acetonitrile. All samples were coated in a stainless steel beaker at 0.26 $mA/cm^2$ for 9 minutes.

The samples exposed to the silane pretreatment followed by a standard PEDOT coating process (0.26 $mA/cm^2$ for 9 minutes) did not coat very evenly. These samples coated well on one side but very unevenly on the other. The samples that were coated with solution 1 (surfactant added) had an uneven coating on both sides of the samples. The samples that were coated with solution 2 (silane added) had an even coating on one side and an uneven coating on the other side.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method for applying a coating to a surface of a cathode foil for use in an electrolytic capacitor comprising an anode foil, a cathode foil and a separator material therebetween impregnated with an electrically conductive electrolyte, the method comprising the steps of:
   (a) placing the cathode foil in an aqueous solution of ethylenedioxythiophene monomer; and
   (b) subjecting the cathode foil to an electric current such that a polyethylenedioxythiophene polymer coating is formed on said surface.

2. The method of claim 1, wherein said aqueous solution comprises an aqueous solution of a doped ethylenedioxythiophene monomer and a cosolvent.

3. The method of claim 2, wherein said aqueous solution comprises about 0.25% by weight to about 5.0% by weight of said ethylenedioxythiophene monomer.

4. The method of claim 2, wherein said aqueous solution comprises about 0.25% by weight to about 5.0% by weight of said dopant.

5. The method of claim 2, wherein said dopant is a sulfate-containing compound selected from the group consisting of ammonium persulfate, ammonium sulfate, naphthalene sulfate and lithium sulfate.

6. The method of claim 2, wherein said dopant is a tetrafluoroborate salt.

7. The method of claim 6, wherein said dopant is selected from the group consisting tetramethyl tetrafluoroborate, tetraethyl tetrafluoroborate, tetrapropyl tetrafluoroborate, tetrabutyl tetrafluoroborate and mixtures thereof.

8. The method of claim 2, wherein said dopant is selected from the group consisting of p-toluenesulfonic acid and its salts.

9. The method of claim 2, wherein said dopant is an electrolyte salt selected from the group consisting of lithium perchlorate, lithium trifluoromethanesulfonate, lithium hexafluoroarsenate, lithium hexafluorophosphate, phosphoric acid and its salts, phosphorous acid and its salts, and hypophosphorous acid and its salts.

10. The method of claim 2, wherein said cosolvent is selected from the group consisting of methanol, ethanol, 1-propanol, 2-propanol, acetonitrile, ethylene glycol, 1,2-propanediol, 1,3-propanediol, 2-methyl-1,3-propanediol.

11. The method of claim 2, wherein said aqueous solution comprises about 1.0% by weight to about 40.0% by weight of said cosolvent.

12. The method of claim 2, wherein said aqueous solution further comprises an oxidizer.

13. The method of claim 12, wherein said aqueous solution comprises about 1.0% by weight to about 5.0% by weight of said oxidizer.

14. The method of claim 12, wherein said oxidizer is an organic acid.

15. The method of claim 14, wherein said oxidizer is a dicarboxylic acid.

16. The method of claim 15, wherein said oxidizer is selected from the group consisting of oxalic acid, maleic acid, suberic acid, azelaic acid and sebacic acid.

17. The method of claim 14, wherein said oxidizer is a hydroxy acid.

18. The method of claim 17, wherein said oxidizer is malic acid.

19. The method of claim 17, wherein said oxidizer is citric acid.

20. The method of claim 2, wherein said aqueous solution further comprises a surfactant.

21. The method of claim 20, wherein said aqueous solution comprises about 0.01% by weight to about 0.5% by weight of said surfactant.

22. The method of claim 20, wherein said surfactant is dioctyl sulfosuccinate.

23. The method of claim 1, wherein said current is a direct current with a current density of about 0.05 mA/cm$^2$ to about 5.0 mA/cm$^2$.

24. The method of claim 1, wherein said current is applied for about 1 minute to about 60 minutes.

25. The method of claim 1, wherein said current is a direct current with a current density of about 0.25 mA/cm$^2$ applied for 2 minutes, followed by a direct current with a current density of about 0.5 mA/cm$^2$ applied for 7 minutes, followed by a direct current with a current density of about 0.25 mA/cm$^2$ applied for 1 minute.

26. The method according to claim 1, further comprising the step of:

(c) prior to step (a), cleaning the surface of the cathode foil.

27. The method of claim 26, wherein said cleaning step is a chemical etch process.

28. The method of claim 1, wherein the cathode foil is composed of a material selected from a group consisting of titanium, niobium, tantalum, magnesium, nickel, zirconium, zinc, platinum, silver, gold and aluminum.

29. The method of claim 1, wherein said cathode foil electrode is subjected to said current in said aqueous solution for multiple iterations in order to further enhance the surface area of said cathode foil.

30. The method of claim 1, wherein said coating enhances the surface area of said cathode foil.

* * * * *